United States Patent [19]
Ericksen

[11] Patent Number: 5,245,507
[45] Date of Patent: Sep. 14, 1993

[54] WEATHER RESISTANT CONTAINER FOR TIMER COMPONENTS OF AN IRRIGATION SYSTEM

[75] Inventor: Kent C. Ericksen, Centerville, Utah
[73] Assignee: Pro-Mark, Inc., Bountiful, Utah
[21] Appl. No.: 870,563
[22] Filed: Apr. 17, 1992
[51] Int. Cl.⁵ .................. H02B 1/10; A01G 25/16
[52] U.S. Cl. ........................ 361/641; 174/67; 200/38 D; 200/51 R; 361/623
[58] Field of Search .......... 361/331, 332, 334, 356, 361/357, 358, 360, 390, 392, 395, 428; 200/33 R, 38 R, 38 D, 51 R, 297; 174/48, 49, 50, 54, 53, 52.3, 58, 59, 66, 67; 220/3.2, 3.92, 3.94, 4.02; 439/535, 539, 620, 843

[56] References Cited

U.S. PATENT DOCUMENTS

| 3,140,344 | 7/1964 | Slater | 361/356 |
| 3,895,179 | 7/1975 | Wyatt | 361/356 |
| 3,906,295 | 9/1975 | Tessmer | 361/356 |
| 4,508,943 | 4/1985 | Pfeiffer | 200/17 R |
| 4,817,623 | 5/1985 | Barner | 361/356 |
| 4,899,019 | 2/1990 | Riceman | 174/67 |
| 5,060,859 | 10/1991 | Barcroft | 239/64 |

OTHER PUBLICATIONS

Pp. 42-59 and 61, 1991-1992 Rain Bird Turf Irrigation Equipment Catalog.
Pp. 31-39, Toro 1991 Irrigation Products Catalog.

*Primary Examiner*—Gerald P. Tolin
*Attorney, Agent, or Firm*—Mallinckrodt & Mallinckrodt

[57] ABSTRACT

The invention is a weather resistant container in the nature of a box with tightly fitting cover for a timer unit controlling operation of an irrigation system and associated transformer and electrical plug. The container also houses an electrical receptacle and wiring. Such container is adapted to receive electrical power from an outside source through conventional electrical conduit. Within the box are provided supports for a removable, broad partition wall defining a relatively shallow wiring compartment between the back wall and the partition wall and a relatively deep compartment between the partition wall and open front of the box for housing the timer components.

14 Claims, 2 Drawing Sheets

WEATHER RESISTANT CONTAINER FOR TIMER COMPONENTS OF AN IRRIGATION SYSTEM

BACKGROUND OF THE INVENTION

1. Field

The invention is in the field of electrical circuit boxes as containers for circuit components and wiring.

2. State of the Art

Electrical circuit boxes are in common use. Although often adapted to serve specialized purposes, in general they serve as closed containers for circuit components and for accompanying electrical wiring. The simplest of these is the so-called junction box. Another type provides for splitting the electrical service to several individual circuits and contains a circuit breaker or fuse for each individual circuit. Other such boxes are specially adapted for outdoor use and are made resistant to weather conditions so that moisture cannot enter.

Various electrical and electronic timing devices have been developed to activate and control the operation of irrigation systems, such as lawn and garden sprinklers. Some of these are supplied with a plug, or with a transformer and plug, for connecting to a standard electrical outlet or receptacle. Most of these are are not weather resistant and must be installed indoors with low voltage wires leading outside to electrically operate valves associated with portions of the system. A wide variety of such devices with various options are currently available. While some sprinkler timers are supplied as waterproof units for mounting outdoors, the selection of such units is limited and such units are generally designed for commercial use such as for golf courses, so are significantly more expensive than units made for residential yards which are generally made for indoor mounting. Thus, for outdoor mounting, the options available are limited. So far as is known by applicant, a weather resistant electrical circuit box for outdoor installation of timer components for controlling an irrigation system generally designed for indoor mounting has not been heretofore provided.

SUMMARY OF THE INVENTION

In accordance with the invention, it has been recognized that placing timer components with accompanying wiring and plug-in connections in a weather proof container would enable electrical service to be supplied via standard, commercially available, electrical conduit outdoors rather than requiring the running of lines to an inside weather protected area.

Accordingly, the invention is a weather resistant container in the nature of a box with tightly fitting cover for a timer unit controlling operation of an irrigation system and an associated transformer and electrical plug. Such container is adapted to receive electrical power from an outside source through conventional electrical conduit to service an electrical receptacle housed within the box. The box is preferably of rectangular configuration having a broad back wall, relatively narrow side walls, and a correspondingly broad open front opposite the back wall. A weather sealing cover is preferably hinged to an elongate side wall for opening and closing the box. Preferably, sealing is accomplished by a gasket positioned in a channel provided along the perimeter of the cover, such gasket and channel being positioned so that the gasket abuts against the wall portions defining the perimeter of the opening when the cover is securely closed over the box opening. The cover may be secured to the box by interengaging latch components provided along corresponding elongate side walls of the cover and box, respectively. Advantageously, there are provided coinciding padlock-receiving members along corresponding elongate side walls of the cover and box, respectively, for securing the box cover against unauthorized entry.

Within the box are provided supports for a removable broad partition wall between the back wall and the front opening, so a compartment for wiring (preferably relatively shallow) is defined between the partition wall and the back wall and a compartment (preferably relatively deep) is defined between the partition wall and the open front of the box for a timer unit and accompanying transformer. The partition wall is adapted to have a timer device mounted on its face confronting the box opening. A single or double opening is provided through the partition wall for receiving the plug-in face of either a single or double electrical receptacle that is itself mounted in the shallow compartment. Also, advantageously there is provided at least one conduit knock-out on a side wall of the box for providing entry of a usual electrical conduit carrying a conductor connected or adapted to be connected to a source of electrical power.

In this way standard sprinkler timing components made for indoor mounting can be selected and easily mounted in the weatherproof box of the invention by merely mounting the timing component on the partition wall as it would be mounted indoors, and pluging the normal transformer into the electrical receptical. Replacement of such timing components is also easily accomplished by using the box of the invention.

THE DRAWINGS

The best mode presently contemplated for carrying out the invention is illustrated in the accompanying drawings, in which:

FIG. 1 is an exploded view in perspective looking toward one end of a weather resistant container of the invention in the form of a rectangular box and hinged cover which is shown open, the internal partition wall being shown above the box in exploded position and the entire view being drawn to a considerably reduced scale;

FIG. 2, a greatly enlarged view in perspective looking from above and somewhat toward the back of the open box and internal partition of FIG. 1, the cover of the box having been removed;

FIG. 3, a top plan view of the box and cover as shown in FIG. 1 but with the partition wall in place, the view being drawn to the enlarged scale of FIG. 2; and an interconnecting electrical supply cable being indicated by broken lines as are the positions of a timer and associated transformer on the partition wall, the plug-in face of a double electrical receptacle being shown on the partition wall; and FIG. 4, a longitudinal vertical section taken on the line 4—4 of FIG. 3.

DETAILED DESCRIPTION OF THE ILLUSTRATED EMBODIMENT

Figure 2:
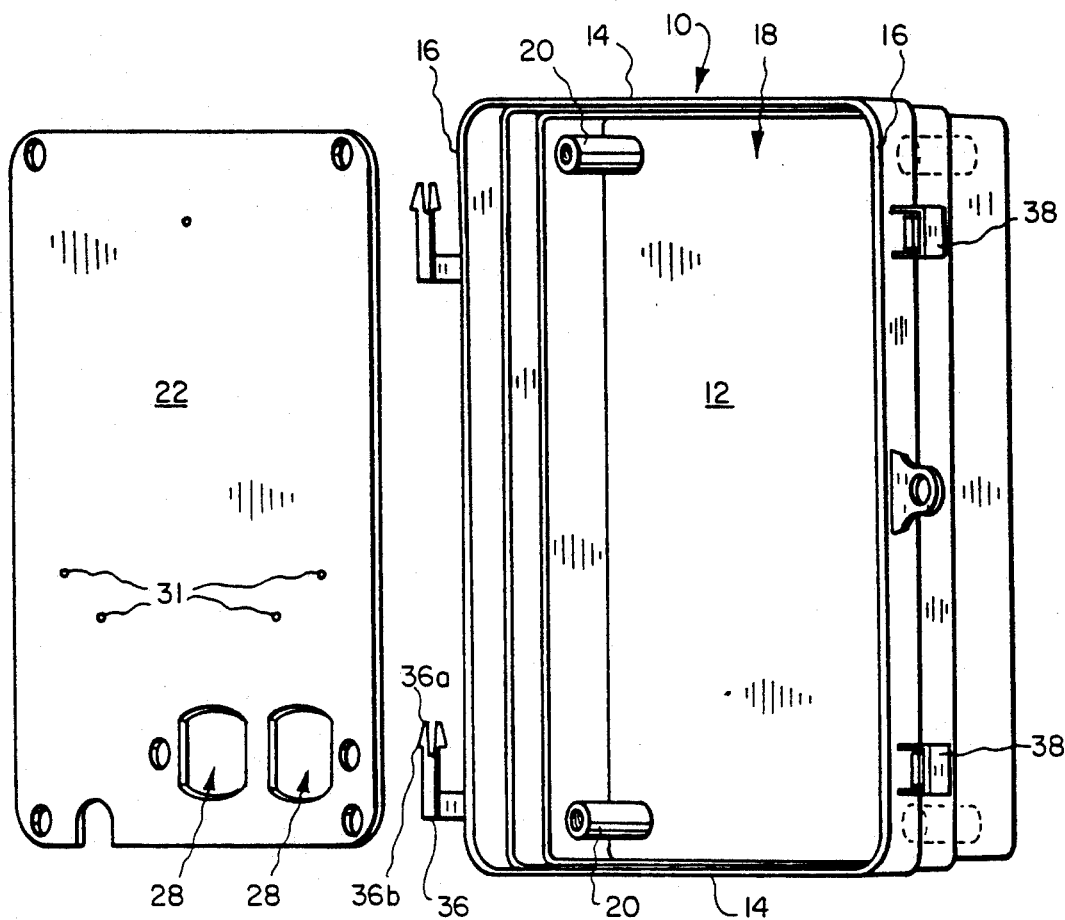

In the form illustrated, the container of the invention comprises a box structure 10 that is of broadly rectangular formation fabricated from usual electrical circuit box material, such as metal or heavy plastic. As best shown in FIG. 2, the box preferably has a broad back wall 12, relatively narrow pairs of side walls 14 and 16, respectively, and opening 18 opposite back wall 12 and correspondingly broad.

Figure 3:
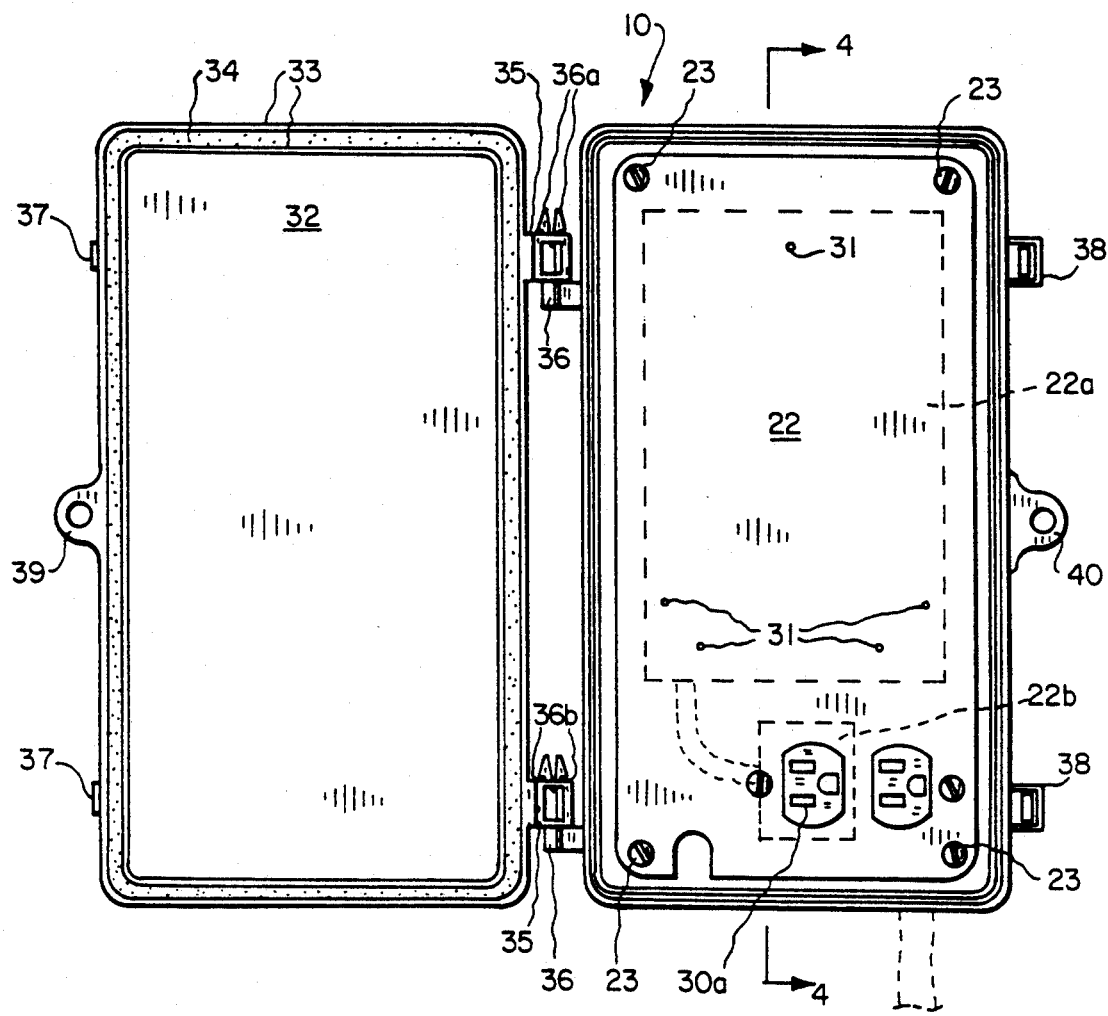
Figure 4:
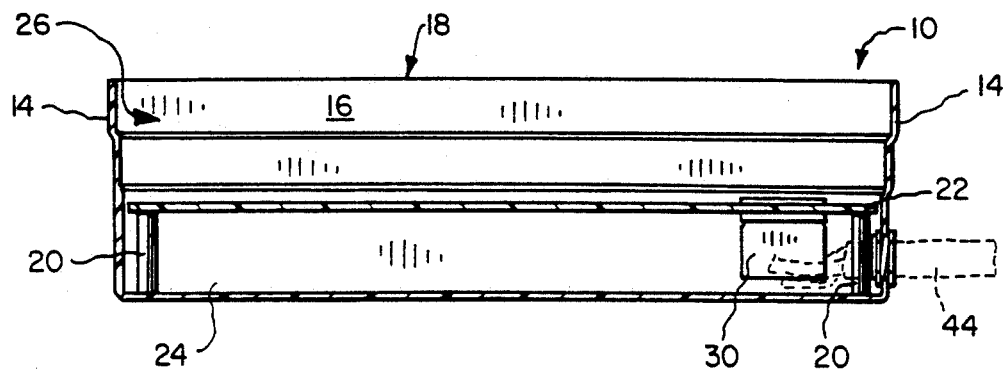

Means within the box, here shown as legs 20, are provided for supporting a broad partition wall 22 between back wall 12 and opening 18, see particularly FIGS. 2 and 4. Partition wall 22 is held securely in place on legs 20 by attachment means, shown in FIG. 3 as screws 23. As best shown in FIG. 4, partition wall 22 with the back and side walls defines a relatively shallow, closed, wiring compartment 24. Such partition wall and the side walls define a relatively deep, open, timer compartment 26 immediately below the box opening 18. The partition wall in this instance is provided with a pair of holes 28, respectively, therethrough, see also FIG. 2. Secured to the underface of the partition wall so that its face portions are exposed in timer compartment 26 as shown in FIG. 3 is a conventional electrical receptacle 30, having double face portions 30a. The electrical wires to receptacle 30 are protectively encased within closed wiring compartment 24. The depth of compartment 24 is generally just enough to accommodate receptacle 30. Compartment 26 is of a size sufficient to accommodate in an area 22a, FIG. 3, on partition wall 22 a conventional timer for controlling operation of an irrigation system and in an area 22b a conventional transformer therefor, if one is required. A plurality of holes 31 are provided in partition wall 22 to easily mount most commercially available brands of timers.

Figure 1:
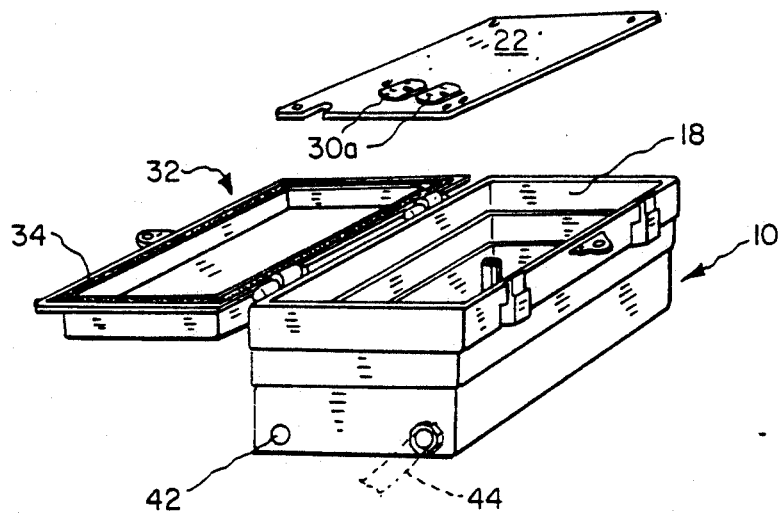

As shown in FIGS. 1 and 3, a sealable cover 32 is provided for closing and sealing the box against the weather. In this instance, weather proofing means in the form of a gasket 34, is positioned between box 10 and cover 32 in a channel 33 provided along the perimeter of the cover. The channel and gasket are aligned so that, when the cover is closed, the gasket abuts against the perimeter of the walls of the box that define opening 18, such gasket operating to seal the box against the penetration of moisture.

Cover 32 is preferably hinged to box 10. In the present instance, pairs of interengaging hinge members 35 and 36, respectively, are provided on corresponding elongate side walls of the cover and box, respectively, so that cover 32 may be opened to provide access to the timer device when desired. In a preferred hinge arrangement, hinge members 36 are molded of a plastic material with enlarged, split end portions 36a. End portions 36a flex together as hinge members 35 are moved over members 36 and with member 35 in assembled position on members 36, portions 36a move outwardly so that shoulders 36b lock members 35 in position thereon. Portions 36a must be squeezed together to thereafter remove the cover 32 from box 10.

Securement of the cover in closed condition is provided for by pairs of interengaging latch members 37 and 38, respectively, provided on corresponding elongate side walls of the cover and box, respectively, opposite those on which the hinge members are secured. Advantageously, there are provided coinciding padlock-receiving members 39 and 40 along the corresponding elongate side walls of the cover and box on which the latch member are provided for locking the box against unauthorized entry.

As shown in FIG. 1, one or more knock-outs 42 to provide entry of and attachment for electrical conduits 44 are provided in at least one side wall of the box. These knock-outs are preferably located in a side wall of box 10 near back wall 12 so that wires entering through an attached conduit will enter directly into the wiring compartment 24.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A weather resistant container for an electrical timer and associated transformer for controlling operation of an irrigation system, comprising:

a box having a broad back wall, and relatively narrow side walls defining a correspondingly broad opening for the box opposite said back wall;

a sealable, removable cover removably covering the opening of said box;

supporting means within said box for supporting a board partition wall between said back wall and said opening;

a broad partition wall mounted on said supporting means and defining a relatively shallow wiring compartment between said partition wall and said back wall and a relatively deep timer compartment between said partition wall and said box opening, said partition wall configured to receive and have secured thereto a self-contained electrical irrigation timer unit and having at least one opening therethrough for receiving the face portion of an electrical receptacle into which the usual transformer associated with the electrical irrigation timer unit may be plugged, the irrigation timer unit and associated transformer both being received within the timer compartment of the box; and an electrical receptacle mounted in said wiring compartment so that the face portion thereof is exposed to said timer compartment through said opening and is disposed for plugging thereinto an electrical plug serving the transformer associated with said timer.

2. A weather resistant container according to claim 1, additionally comprising:

at least one conduit knock-out in at least one side wall of said box, said conduit knock-out communicating with said wiring compartment.

3. A weather resistant container according to claim 1, additionally comprising:

a pair of padlock receiving members carried by respective corresponding sides of said cover and the box for locking the cover to said box to guard against unauthorized entry into the box.

4. A weather resistant container according to claim 1, wherein there is provided weather proofing means positioned between said box and cover when the cover is applied over the opening of the box.

5. A weather resistant container according to claim 4, wherein there is provided a channel along the perimeter of the cover into which is positioned a gasket abutting the walls of the box that define the perimeter of the opening of the box when the cover is positioned over the opening, said gasket operating to seal the box against the penetration of moisture.

6. A weather resistant container according to claim 4 wherein the cover and box have interengaging hinge members along corresponding side walls.

7. A weather resistant container according to claim 6, wherein the cover and box have interengaging latch members along corresponding side walls opposite said side walls carrying said hinge members for securing the cover in the closed position.

8. A weather resistant container according to claim 1, wherein the partition wall has two holes therethrough, said holes receiving the two outlet faces of a double electrical plug-in receptacle and the receptacle is mounted in the wiring compartment so that the outlet faces of the receptacle are substantially flush with the forward face of the partition wall.

9. A weather resistant container for an electrical timer and associated transformer for controlling operation of an irrigation system, comprising:

a box having a broad back wall, and relatively narrow side walls defining a corresponding board opening for the box opposite said back wall;

supporting means within said box for supporting a broad partition wall between said back wall and said opening;

a sealable, removable cover removably covering the opening of said box;

a broad partition wall mounted on said supporting means and defining a relatively shallow wiring compartment between said partition wall and said back wall and a relatively deep timer compartment between said partition wall and said box opening, said partition wall configured to receive and have secured thereto a self-contained electrical irrigation timer unit and having at least one opening therethrough for receiving the face portion of an electrical plug-in receptacle into which the usual transformer associated with the electrical irrigation timer unit may be plugged, the irrigation timer unit and associated transformer both being received within the timer compartment of the box;

attachment means securing said partition wall to the supporting means;

a gasket positioned in a channel provided along the perimeter of the cover, said gasket being positioned so that it abuts against the side walls defining the perimeter of the opening of said box and providing an effective seal against penetration by moisture;

interengaging hinge members on confronting sides of the cover and the box, respectively;

interengaging latch members on the confronting sides of the cover and the box, respectively, opposite the sides carrying the hinge members;

a pair of padlock receiving members carried by respective corresponding sides of said cover and the box for locking the cover to said box to guard against unauthorized entry into the box;

an electrical plug-in receptacle mounted in said wiring compartment so that the plug-in face thereof is exposed to said timer compartment through said opening and is disposed for the plugging thereinto of an electrical plug serving said timer; and at least one conduit knock-out in at least one side wall of said box, said conduit knock-out communicating with said wiring compartment.

10. A weather resistant container according to claim 9, wherein the partition wall is configured to receive and have secured thereto a self-contained electrical irrigation timer unit by having openings therethrough to receive mounting screws, said openings corresponding to mounting screw openings provided in the self-contained electrical irrigation timer unit to be mounted on the partition wall.

11. A weather resistant container according to claim 9, wherein the electrical plug-in receptacle is mounted in the wiring compartment by being secured to the partition wall in the wiring compartment.

12. A weather resistant container according to claim 1, wherein the partition wall is configured to receive and have secured thereto a self-contained electrical irrigation timer unit by having openings therethrough to receive mounting screws, said openings corresponding to mounting screw openings provided in the self-contained electrical irrigation timer unit to be mounted on the partition wall.

13. A weather resistant container according to claim 1, wherein the electrical plug-in receptacle is mounted in the wiring compartment by being secured to the partition wall in the wiring compartment.

14. Electrical timing apparatus for outdoor installation to control operation of an irrigation system, comprising an open box having a cover; weather proofing means positioned between box and cover when the cover is applied over the opening of the box; and internal partition wall within the box substantially in parallel with the box opening and dividing the box into a closed wiring compartment and a superimposed open timer compartment immediately below said box opening; means supporting said partition wall in position within the box; an electrical receptacle positioned in said closed wiring compartment of the box and having a plug-in face opening into said open timer compartment of the box; self-contained electrical irrigation timing control means within its own housing secured to the partition wall in the timer compartment of the box; and electrical wiring within the closed wiring compartment of the box connecting the electrical receptacle to a source of electricity.

* * * * *